(12) United States Patent
Schmidt et al.

(10) Patent No.: US 6,511,639 B1
(45) Date of Patent: Jan. 28, 2003

(54) PROCESS FOR RECYCLING NEGATIVE-ELECTRODE MATERIALS FROM SPENT LITHIUM BATTERIES

(75) Inventors: Michael Schmidt, Weiterstadt (DE); Reinhard P. Hemmer, Illertissen (DE); Margret Wohlfahrt-Mehrens, Illertissen (DE); Giesela Arnold, Ulm (DE); Christian Vogler, Ulm (DE)

(73) Assignee: Merck Patent Gesellschaft mit beschrankter Haftung (DE)

( * ) Notice: Subject to any disclaimer, the term of this patent is extended or adjusted under 35 U.S.C. 154(b) by 147 days.

(21) Appl. No.: 09/584,059

(22) Filed: May 30, 2000

(30) Foreign Application Priority Data

May 28, 1999 (DE) .......................................... 199 24 707

(51) Int. Cl.[7] ............................ C22B 7/00; C22B 26/00
(52) U.S. Cl. ...................................... 423/179.5; 429/49
(58) Field of Search ........................ 423/179.5; 429/49; 241/23

(56) References Cited

U.S. PATENT DOCUMENTS

| | | | | |
|---|---|---|---|---|
| 4,637,928 A | * | 1/1987 | Zajac, Jr. et al. | |
| 4,980,080 A | * | 12/1990 | Lecerf et al. | |
| 5,352,270 A | * | 10/1994 | Shackle | |
| 5,478,664 A | * | 12/1995 | Kaneko et al. | |
| 5,612,150 A | * | 3/1997 | Nishimura et al. | |
| 5,714,129 A | * | 2/1998 | Nishimura et al. | |
| 5,882,811 A | * | 3/1999 | Kawakami | |
| 6,150,050 A | * | 11/2000 | Mathew et al. | |

* cited by examiner

*Primary Examiner*—Steven Bos
(74) *Attorney, Agent, or Firm*—Millen, White, Zelano & Branigan, P.C.

(57) ABSTRACT

A process for recycling electrode materials from spent lithium batteries in which negative-electrode materials from the lithium/transition-metal mixed oxide class of compounds from discharged, spent lithium batteries can, after comminution of the electrode constituents, be re-synthesized into chemically identical products as employed for the production of the batteries comprising mechanical and extractive processing of these constituents with the aim of removing positive-electrode constituents and other secondary constituents, such as binders and other processing auxiliaries, followed by controlled high-temperature treatment without leaving thermal decomposition products behind.

17 Claims, 3 Drawing Sheets

PROCESS FOR RECYCLING NEGATIVE-ELECTRODE MATERIALS FROM SPENT LITHIUM BATTERIES

The invention relates to a process for recycling electrode materials from discharged, spent lithium batteries in which negative-electrode materials from the lithium/transition-metal mixed oxide class of compounds from discharged, spent lithium batteries can, after comminution of the electrode constituents, be re-synthesized into chemically identical products as employed for the production of the batteries, by mechanical and extractive processing of these constituents with the aim of removing positive electrode constituents and other secondary constituents, such as binders and other processing auxiliaries, followed by controlled high-temperature treatment, without leaving thermal decomposition products behind.

The demand for rechargeable lithium batteries is high and will increase much more considerably still in the future. The reasons for this are the high energy density that can be achieved, and the low weight of these batteries. These batteries are used in mobile telephones, portable video cameras, laptops, etc.

As is known, the use of metallic lithium as positive electrode material results, owing to dendrite formation during dissolution and deposition of the lithium, in inadequate cycle stability of the battery and in a considerable safety risk (internal short-circuit) (J. Power Sources, 54 (1995) 151).

These problems have been solved by replacing the lithium-metal positive electrode by other compounds which can reversibly intercalate lithium ions. The principle of functioning of lithium ion batteries is based on the fact that both the negative-electrode and positive-electrode materials can reversibly intercalate lithium ions, i.e. the lithium ions migrate out of the negative electrode during charging, diffuse through the electrolyte and are intercalated in the positive electrode. During discharging, the same process occurs in the opposite direction. Owing to this mechanism of functioning, these batteries are also referred to as "rocking-chair", or lithium ion batteries.

The resultant voltage of a cell of this type is determined by the lithium intercalation potentials of the electrodes. In order to achieve the highest possible voltage, negative-electrode materials which intercalate lithium ions at very high potentials and positive-electrode materials which intercalate lithium ions at very low potentials (vs. $Li/Li^+$) must be used. Negative-electrode materials which satisfy these requirements are $LiCoO_2$ and $LiNiO_2$, which have a layered structure, and $LiMn_2O_4$, which has a cubic three-dimensional network structure. These compounds eintercalate lithium ions at potentials of around 4 V (vs. $Li/Li^+$). In the case of the positive-electrode compounds, certain carbon compounds, such as, for example, graphite, meet the requirement of low potential and high capacity.

The electrolytes used are mixtures which contain aprotic solvents in addition to a conductive salt. The most frequently used solvents are ethylene carbonate (EC),propylene carbonate (PC), dimethyl carbonate (DMC), diethyl carbonate (DEC) andethyl methyl carbonate (EMC). Although a whole series of conductive salts is being discussed, $LiPF_6$ is used virtually without exception.

Negative-electrode, materials in accumulators are functionally constructed multicomponent mixtures. The actual active material, which, in commercially available lithium accumulators, consists of binary lithium/transition metal mixed oxides, is mixed with auxiliaries which influence both the electrochemical characteristics of the electrodes and the processing properties.

Use is made of graphite and technical-grade carbon as electrically conductive auxiliaries, polymers (such as, for example, polyvinylidene fluoride and butadiene-styrene copolymers, and chemically modified celluloses) as binders, which improve the adhesion to a metallic support, and mixture modifiers for improving the processing properties of the composite mixture.

In addition, the electrochemically active electrode pack, besides metallic support material (copper and aluminum foil for positive-electrode and negative-electrode material), also comprises a separator-foil (polyalkene, preferably polypropylene) and as electrolyte, a solvent mixture in which the conductive salts is dissolved.

The separation. and processing of the various constituents is very complex. In general, processing methods involving a plurality of technologically different process steps are used for this purpose, but they generally only enable the recovery of the individual transition metals in the form of simple salts.

There is a need for an economical process which enables valuable negative-electrode raw material to be recovered from spent lithium batteries without following the circuitous route via re-synthesis from dissolved salts obtained by digestion methods or other degradative processes.

For the recovery of metals from secondary raw materials of a general nature intended for recycling, use is generally made of digestion methods, in which the metals are recycled in dissolved or adsorbed form, where the recycling does not consist in the original use of the materials, but in which the recovered metals are employed for neosynthetic processes.

Thus, U.S. Pat. No. 5,443,619 describes a process in which the metals of interest are recovered by extraction from aqueous solutions. The recovery processes used include leaching processes, as described, for example, in U.S. Pat. No. 5,364,444. The recovery of valuable metals from spent catalysts by a combination of various chemical processing steps and selective extraction is described in EP 652978.

The recovery of metallic raw materials from batteries is a technologically relatively new area. Processing methods have been described for various types of battery: for example, the recovery of manganese using a combination of wet digestion methods and a roasting process has been described (Progress in Batteries & Battery Materials, 13 (1994), 367 ff). In U.S. Pat. No. 5,407,463, the recovery of the metallic raw materials cadmium, nickel and iron from Ni/Cd batteries is achieved by wet acidic digestion, extraction and wet-chemical separation.

In the treatment of lithium batteries in general and of lithium accumulators in particular, similar working methods are used for material recovery, in particular of the metals present, with adaptation of the process steps to the specific material properties of these batteries. Thus, JP 11-6020 and Hydrometallurgy 47 (1998) pg. 259, describe the extractive recovery of cobalt from lithium cobaltate-containing batteries using a combination of electrochemical and wet-chemical methods. A further process for the recovery of raw materials from lithium batteries is published in the symposium proceedings "Treatment and Minimization of Heavy Metal containing Wastes", Proc. Int. Symp. (1995) pg. 257. In this process, lithium and manganese are converted into carbonates. The metals iron, nickel and chromium are recovered separately as dissolved nitrates by acidic digestion.

The object of the invention is therefore to provide the recycling of negative-electrode materials, consisting of lithium/transition metal mixed oxides, from spent, discharged lithium batteries, which materials can be re-used in the production of lithium batteries.

The object according to the invention is achieved by a process for the recovery of negative-electrode materials from the lithium/transition metal mixed oxide class of compounds from spent lithium batteries, comprising the following steps:

i) uncovering of the electrode pack consisting at least of the positive-electrode unit, the separator parts, the electrolyte and the negative-electrode unit, ii) extraction of the electrode pack with an organic solvent, iii) drying of the extracted electrode pack, iv) mechanical separation of the positive-electrode unit from the electrode pack treated in this way, v) grinding and classification of the residual electrode pack obtained from step iv, vi) subjection of the material obtained from step v to high-temperature treatment at temperatures of from about 300 to about 700° C. under such conditions that essentially no thermal decomposition products remain in the negative electrode materials recovered here.

The present invention relates to undoped and doped, ternary or multinary mixed oxides as negative electrode materials. The present invention also relates to other lithium intercalation compounds which are suitable for 4 V negative electrodes.

It has been found that the process according to the invention enables the selective removal of the secondary constituents, additives and auxiliaries, such as foils, binders, and carbon, from the recyclable negative-electrode material.

It has also been found that 1,2-dimethoxyethane, dimethyl carbonate, ethyl acetate and acetone are particularly suitable solvents for the usual conductive salts.

Surprisingly, it has been found that regulated high high-temperature treatment of the negative-electrode material enables the material to be restructured.

A chemically and structurally identical negative electrode material as previously used in the battery can be recovered in a few simple and technologically well-controlled process steps while saving time and large amounts of energy.

It has been found that the recovered material is highly suitable f or reuse in a battery of the same type as addition to negative-electrode material.

Figure 1:
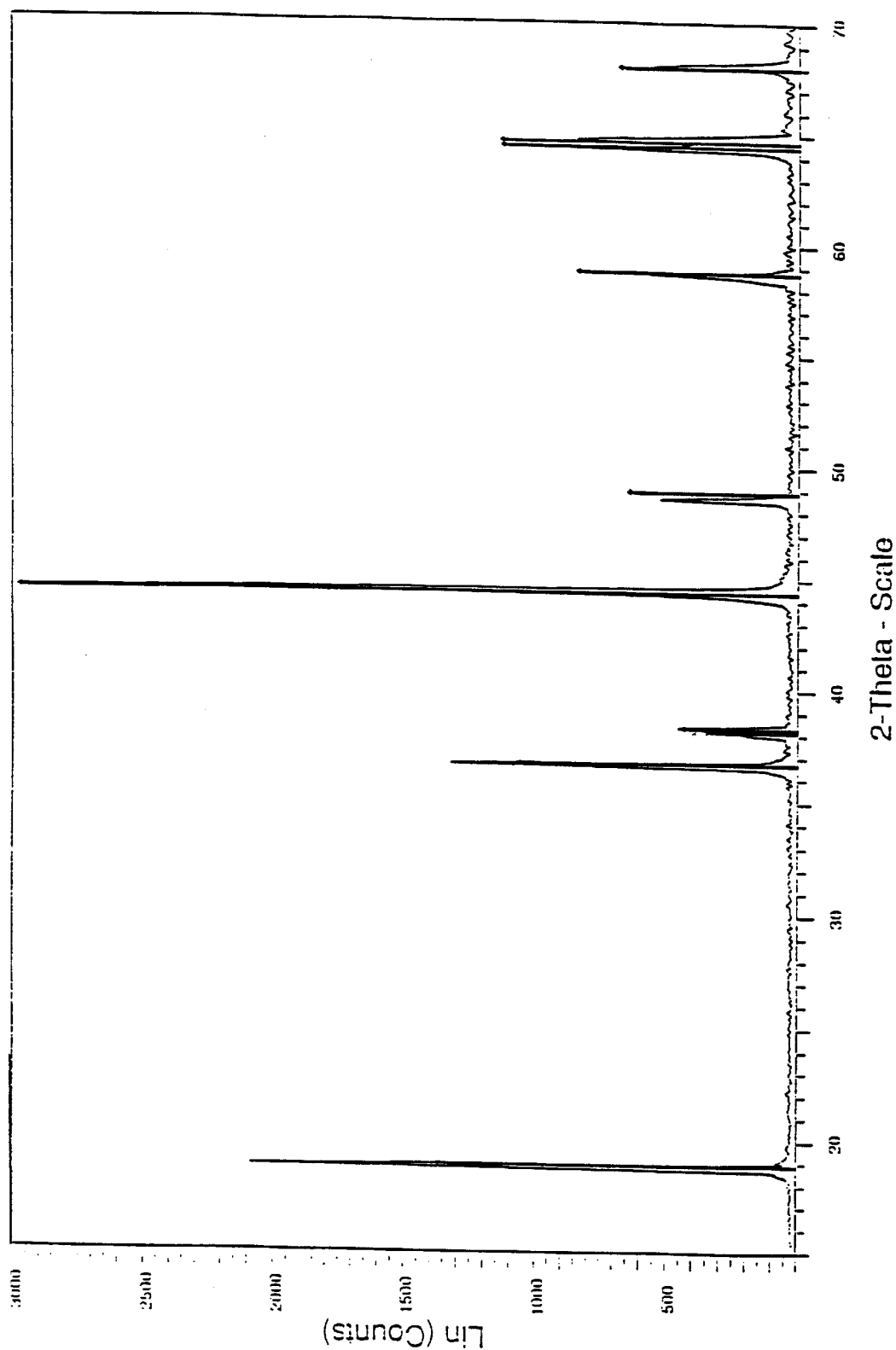
FIG. 1 depicts the x-ray diffraction diagram of lithium nickelate.

The process on which the invention is based can be divided into five individual steps:

i) uncovering of the electrode pack ii) extraction of the electrode pack iii) drying of the extracted electrode pack, iv) mechanical separation of the positive-electrode v) grinding and classification of the negative electrode unit with separator foil, vi) regulated high-temperature treatment of the negative-electrode material.

i) Uncovering of the Electrode Pack

To this end, the individual cell is drilled or sawed open at the top and bottom, and the electrolyte solution is removed by pressing, suction or washing out with a suitable solvent which dissolves the conductive salt, while avoiding entry of moisture from the casing.

The electrode pack is then uncovered by mechanical removal of the base and lid by machine followed by longitudinal sawing and bending up of the enveloping casing.

The electrode material is then firstly cut into easily handled slices using a saw, and these slices are then again cut in half transversely to the first cut direction. The cut pieces are immediately thereafter immersed in a bath of a suitable solvent which dissolves the conductive salt.

As early as this point in time, depending on the nature of the battery materials, the electrode pack can be dissolved by mechanical agitation of the bath either at room temperature or at another temperature, which, however, must be below about 60° C., mechanical pre-sorting can be carried out, and the conductive salt can be dissolved out.

ii) Extraction of the Electrode Pack

The electrode strips prepared in this way (mixture of positive-electrode and negative-electrode strips and separator strips), together or after appropriate presorting, are extracted (for example in a Soxhlet apparatus) with a suitable solvent which dissolves the conductive salt, until conductive salt decomposition products (for example fluoride from lithium hexafluorophosphate) can no longer be detected in the extraction solution or until the concentration of decomposition products exceeds or falls below a value which is beneficial to the remainder of the process.

Particularly suitable solvents for common conductive salts, such as $LiPF_6$, $LiBF_4$, $LiClO_4$, $LiAsF_6$, $LiCF_3SO_3$, $LiN(CF_3SO_2)_2$ and $LiC(CF_3SO_2)_3$, a thereof, are 1,2-dimethoxyethane, dimethyl carbonate, ethyl acetate and acetone.

The solvents used for the extraction can, if necessary, be recovered and worked up in a known manner in consideration of the chemical properties of the dissolved conductive salt.

In the extraction, it is primarily binder materials that are dissolved out of the electrode material. In most types of batteries, the graphitic positive-electrode material remains firmly adhered to the support foil, whereas, the negative-electrode material on the separator foil and on the aluminum support plate is loosened or even detached in this procedure due to swelling.

For the further processing steps, it is unimportant whether negative-electrode active material remains adhering to the foils in a loose association and how much of the active material is washed off the supports even during the extraction.

iii) Drying of the Extracted Electrode Pack

The extracted electrode material is optionally dried with or without support foils, under reduced pressure or only by static drying at temperatures a little above the boiling point of the extractant used. The extraction solvent can be recovered, if required, by known methods.

iv) Mechanical Separation of the Positive-electrode Unit

The extracted, dried electrode materials are subjected to a mechanical separation method (for example air classification) in order to separate off the positive-electrode material strips. The abraded material produced during removal of the positive-electrode material, consisting principally of carbon and binders, can be added to the negative-electrode material.

The majority of the pulverulent or crumb-form positive electrode material can be removed mechanically (for example by grinding) from the separated-off positive-electrode strips. Carbon and binder can be disposed of thermally, and the aluminum support plate can then be subjected to known recycling methods.

v) Grinding and Classification of the Negative-electrode Material with Separator Foil The negative-electrode materials rinsed off during the extraction and the material still adhering to the separator foil and aluminum support plate are ground for complete mechanical separation of the parts. Suitable for this purpose are, advantageously, mills which allow continuous separation of the comminuted material from the parts to be separated during the grinding process.

The separated-off support plates (aluminum) can also be subjected to known recycling methods after this step. The separator foil which can be separated off after the grinding step can either be subjected to separate thermal energy recovery or processed with the other materials in the next process step without harming the process if, for example, the relatively large amounts of negative-electrode active material still adhere thereto.

If, as a consequence of the design, separation off from the negative-electrode material and separator foil is not possible, the positive-electrode material can also remain present during the remainder of the processing of the negative-electrode material without harming the process.

After the extraction, all three materials are jointly dried and ground, and the support foils are then separated off in a known manner.

In this case, however, it is necessary to set an oxygen balance in the tempering furnace which regulates optimum burn-out in the high-temperature treatment described below.

vi) Regulated High-temperature Treatment (tempering) of the Negative-electrode Material The negative-electrode or negative-and positive-electrode raw material obtained in this way still contains graphite, possibly special carbon and, in the case of incomplete removal of the separator foil, constituents of this material (generally polypropylene) and small amounts of foreign ions which are still permissible for further processing of the material, owing to the character of the conductive salt, small amounts of fluoride, sulfate, phosphate or borate.

The powdered, dry material is subjected to controlled high-temperature treatment in a suitable furnace for high-temperature treatment (for example rotary-tube furnace, with circulated air or oxygen aeration device).

An important step in the procedure according to the invention is to subject this material to high-temperature treatment at temperatures of from about 300 to about 700° C., preferably from about 450 to about 600° C., under such conditions that essentially no thermal decomposition products remain in the negative-electrode materials recovered here. The ambient atmosphere here must be of such a nature that a permanently reducing atmosphere is not generated during the high-temperature treatment. Regulation of the oxygen balance can be effected, for example, by air circulation or by additional supply of an oxygen-containing gas. The high-temperature treatment is carried out over a period of from about 4 to about 20 hours, preferably from about 9 to about 11 hours.

In this way, negative-electrode material which is phase-pure according to X-ray studies is produced as processed material which is suitable for use as addition in the production of new lithium batteries corresponding to the original design.

The examples below are intended to illustrate the invention in greater detail, but without representing a limitation.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents and publications, cited above or below, and of corresponding German application No. 19924707.2, filed May 28, 1999 are hereby incorporated by reference.

EXAMPLES

Example 1

The electrode material from a lithium accumulator (for example constructed from a graphitic positive electrode, an electrolyte-permeable separator and a negative electrode made from an active material comprising lithium nickelate) is isolated in the manner described, comminuted and then softened in dry ethyl acetate. After a hold time of five hours at room temperature, the positive-electrode material is separated off mechanically, and the negative -electrode material and the separator particles are subjected to extraction with ethyl acetate as solvent.

After extraction for eight hours, the organic electrolyte solvent (dimethyl carbonate, ethylene carbonate or propylene carbonate), polyvinylidene fluoride and other binders, and the dissolved lithium hexafluorophosphate have been substantially dissolved out of the negative-electrode material.

Ethyl acetate can be recovered by known methods. If required by the nature of the conductive salt, this must be rendered harmless in advance for example by controlled hydrolysis.

The negative-electrode material is dried, ground and passed through a sieve. It is then subjected to controlled high-temperature treatment.

Figure 2:
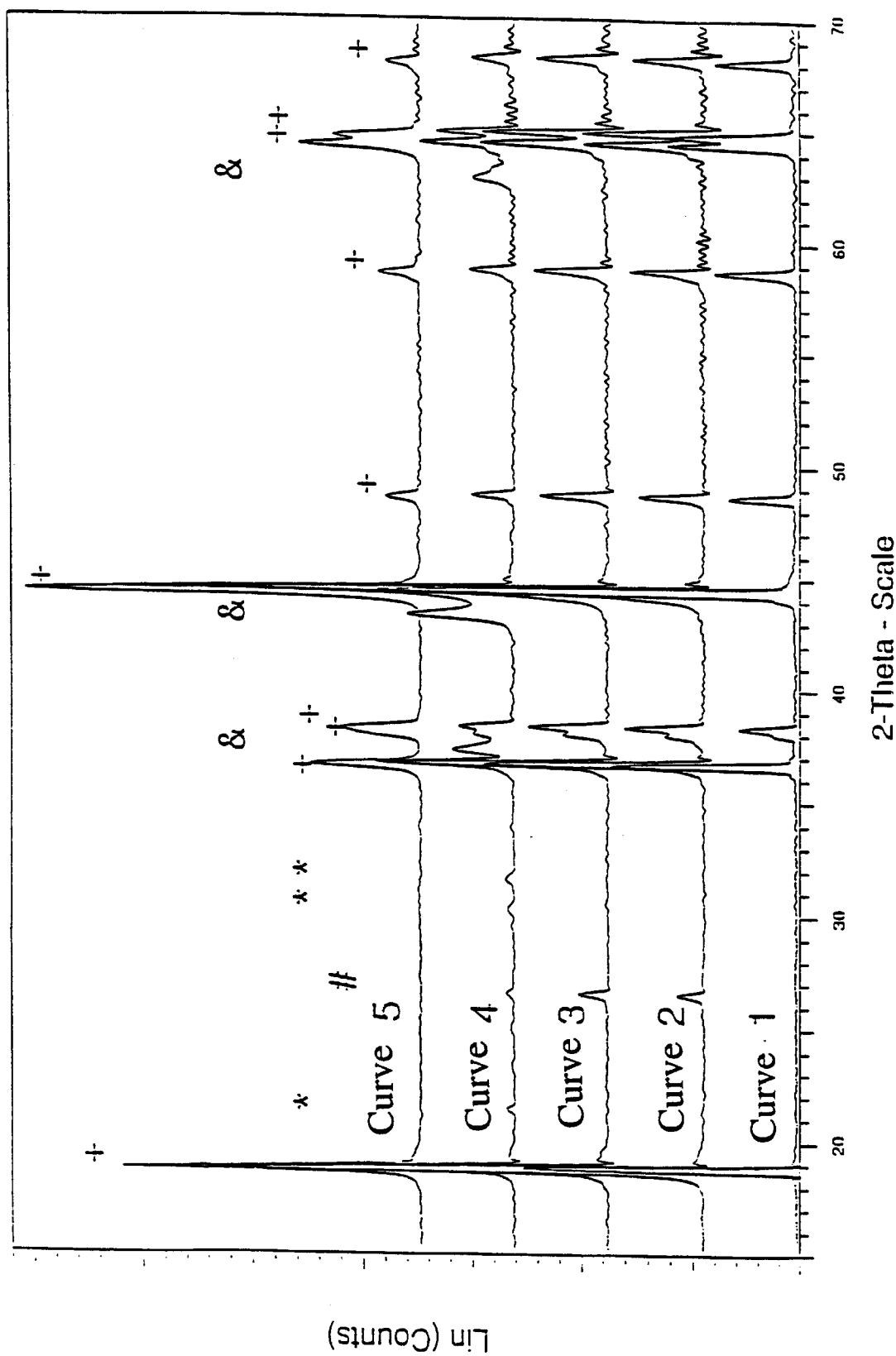
FIG. 2 depicts the x-ray diffraction diagram of recovered negative-electrode materials in a static chamber furnace.
Figure 3:
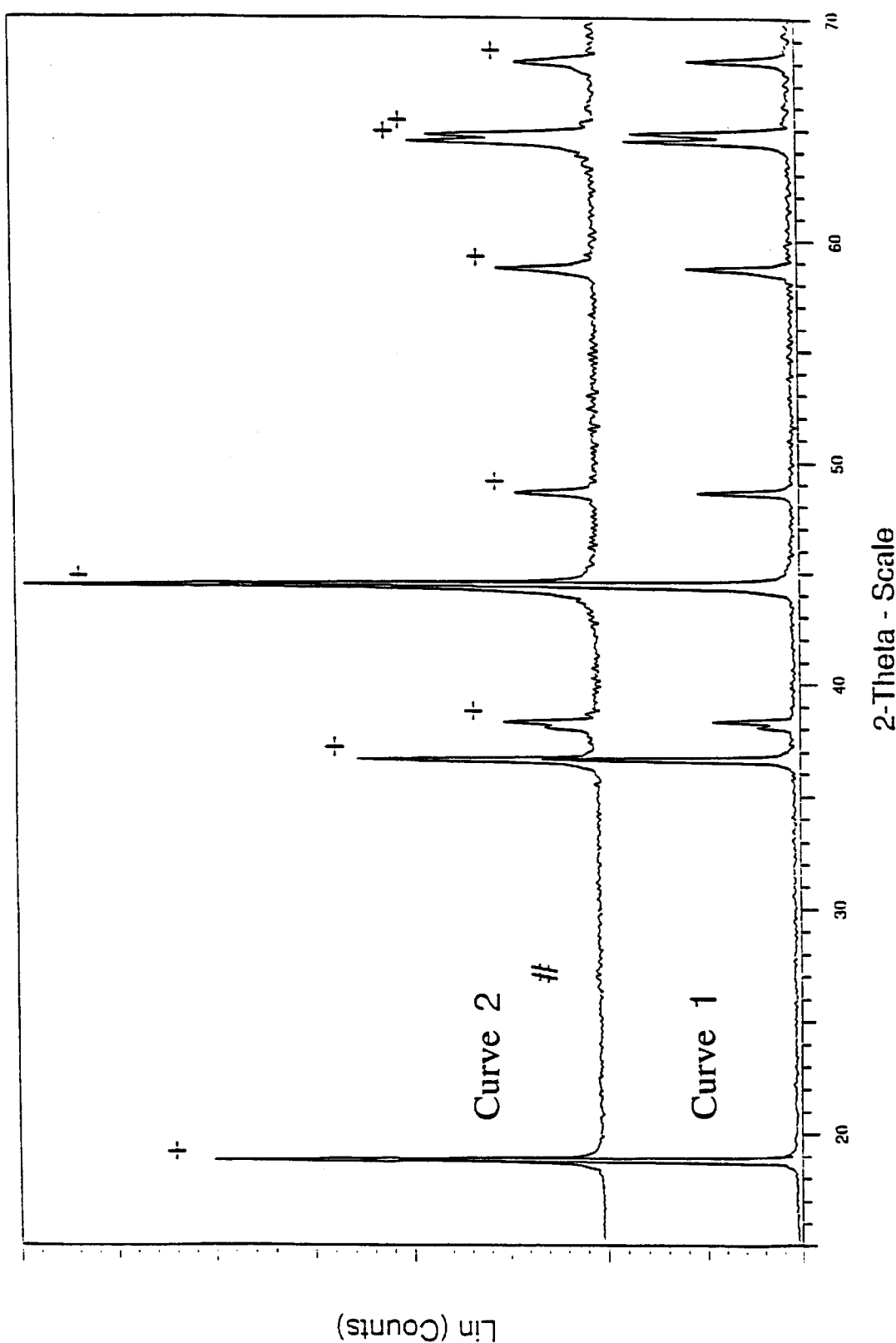
FIG. 3 depicts the x-ray diffraction diagram of recovered negative-electrode materials in an air circulated furnace.

The results of the process according to the invention and the characterization by X-ray analysis of the lithium nickelate then recovered are shown in FIGS. 1 to 3.

FIG. 1 shows the X-ray diffraction diagram of commercially available lithium nickelate intended for battery applications, with the lines for the diffraction pattern of the diffraction diagram for the compound $LiNiO_2$ deposited in the ICDD database under the number 09-0063.

FIG. 2 shows the X-ray diffraction diagrams of recovered negative-electrode materials obtained at various burn-out temperatures in a chamber furnace statically (without circulating air) and without oxygen enrichment of the furnace atmosphere at various temperatures (burn-out duration in each case 4 hours).

Curve 1: commercial lithium nickelate for battery applications

Curve 2: re-synthesized material; burn-out temperature: 300° C. The signal denoted by # is caused by the incompletely burnt out graphite.

Curve 3: re-synthesized material; burn-out temperature: 400° C. The signal denoted by # is caused by the incompletely burnt out graphite.

Curve 4: re-synthesized material; burn-out temperature: 500° C. The material obtained is no longer phase-pure.

Underneath the curve are the line diffraction diagrams for residual substances (# denotes graphite) and potential decomposition products (& denotes nickel oxide,* denotes lithium carbonate).

Explanation for curve 4: the high-temperature treatment at 500° C. causes partial reductive conversion of the lithium nickelate with formation of nickel oxide. The lithium liberated during this process reacts with the carbon dioxide originating from the carbon burn-out, with formation of lithium carbonate.

Curve 5: lithium nickelate re-synthesized from the spent battery; burn-out temperature 700° C. The product is again phase-pure. Explanation for curve 5: during tempering of the re-synthesized product at 700° C., re-synthesis of the lithium nickelate from nickel oxide and lithium carbonate takes place with elimination of carbon dioxide. The formation mechanism corresponds to a known solid-state synthetic route for the preparation of lithium nickelate. FIG. 3: the diagram shows the result of a further burn-out experiment at 450° C. with air circulation, with a burn-out duration of 12 hours.

Curve 1: commercial lithium nickelate for battery applications. The line diffraction diagrams underneath are graphite M and the lithium nickelate from the ICDD database (+).

Curve 2: X-ray diffraction diagram of the phase pure lithium nickelate re-synthesized from the spent battery.

The preceding examples can be repeated with similar success by substituting the generically or specifically described react ants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for the recovery of negative-electrode materials from lithium and transition metal mixed oxide class of compounds from spent lithium batteries, comprising:
    i) uncovering an electrode pack comprising a positive-electrode unit, separator parts, an electrolyte and a negative-electrode unit,
    ii) extracting the uncovered electrode pack with an organic solvent,
    iii) drying the extracted electrode pack,
    iv) mechanically separating the positive-electrode unit from the dried electrode pack,
    v) grinding a residual electrode pack obtained from step iv)
    vi) subjecting material obtained from v) to high-temperature treatment at temperatures of from about 300 to about 700° C.

2. The process according to claim 1, wherein the lithium and transition metal mixed oxide class of compounds are ternary lithium and transition metal mixed oxides.

3. The process according to claim 1, in which secondary constituents and auxiliaries of the battery are mechanically separated off.

4. The process according to claim 1, wherein the solvent in ii) is dimethoxyethane, ethyl acetate, dimethyl carbonate, acetone or mixtures thereof.

5. The process according to claim 1, wherein the high-temperature treatment is carried out with regulated oxygen balance in such a way that a thermal decomposition product is not formed.

6. The process according to claim 1, wherein the treatment temperature is generated by resynthesizing the negative-electrode material in situ from the partially formed decomposition products.

7. The process according to claim 1, wherein the high-temperature treatment is carried out at about 450 to about 600° C.

8. The process according to claim 1, wherein the high-temperature treatment is carried out for a period of from about 8 to about 11 hours.

9. The process according to claim 1, wherein an oxygen balance is regulated during the high temperature treatment.

10. The process according to claim 9, wherein the regulation of the oxygen balance is either by air circulation or by additional supply of an oxygen containing gas.

11. The process according to claim 1, further comprising: classifying the residual pack obtained after grinding.

12. The process according to claim 1, wherein the high-temperature treatment is carried out at 450 to 600° C.

13. The process according to claim 1, wherein the high-temperature treatment is carried out for a period of from 8 to 11 hours.

14. The process according to claim 5, wherein the thermal decomposition product is nickel oxide or lithium carbonate.

15. A process for the recovery of negative-electrode materials from the lithium and transition metal mixed oxide class of compounds from spent lithium batteries, comprising:
    i) uncovering an electrode pack comprising a positive-electrode unit, separator parts, an electrolyte and a negative-electrode unit,
    ii) extracting the uncovered electrode pack with an organic solvent,
    iii) drying the extracted electrode pack,
    iv) mechanically separating the positive-electrode unit from the dried electrode pack,
    v) grinding a residual electrode pack obtained from step iv)
    vi) subjecting material obtained from v) to high-temperature treatment at temperatures of from 300 to 700° C.

16. A process according to claim 15, wherein the material is treated so essentially no thermal decomposition products remain in a recovered negative electrode material.

17. A process according to claim 15, wherein uncovering the electrode pack further comprises removing the electrolyte solution.

* * * * *